United States Patent

Kaelin

(10) Patent No.: US 6,669,528 B2
(45) Date of Patent: Dec. 30, 2003

(54) SINGLE HAND ACTUATED FRICTION TYPE BOX CALL

(75) Inventor: John R. Kaelin, Charlestown, IN (US)

(73) Assignee: Ebsco Industries, Inc., Birmingham, AL (US)

( * ) Notice: Subject to any disclaimer, the term of this patent is extended or adjusted under 35 U.S.C. 154(b) by 0 days.

(21) Appl. No.: 10/074,438

(22) Filed: Feb. 11, 2002

(65) Prior Publication Data

US 2003/0114073 A1 Jun. 19, 2003

(51) Int. Cl.⁷ ............................................. A63H 5/00
(52) U.S. Cl. ........................................ 446/397; 446/418
(58) Field of Search .......................... 446/397, 418, 446/421

(56) References Cited

U.S. PATENT DOCUMENTS

| | | | | |
|---|---|---|---|---|
| 574,534 A | * | 1/1897 | Gibson | 446/397 |
| 651,752 A | * | 6/1900 | Draughon | 446/397 |
| 1,034,307 A | * | 7/1912 | Saunders | 446/397 |
| 1,449,756 A | * | 3/1923 | Jackson | 446/397 |
| 2,025,181 A | * | 12/1935 | Simon | 446/397 |
| 2,511,403 A | * | 6/1950 | Fleener | 446/397 |
| 2,515,023 A | * | 7/1950 | Thomson et al. | 446/397 |
| 2,606,401 A | * | 8/1952 | Boatwright | 446/397 |
| 2,629,968 A | * | 3/1953 | Herter | 446/397 |
| 2,642,699 A | * | 6/1953 | Green | 446/397 |
| 2,958,157 A | * | 11/1960 | Tannehill | 446/397 |
| 3,100,948 A | * | 8/1963 | Tax | 446/397 |
| 3,129,527 A | * | 4/1964 | Williams | 446/397 |
| 3,367,064 A | * | 2/1968 | Anthony et al. | 446/397 |
| 3,793,767 A | * | 2/1974 | Pulley | 446/397 |
| 3,927,490 A | * | 12/1975 | Grayson | 446/397 |
| 4,003,159 A | * | 1/1977 | Piper | 446/397 |
| 4,041,639 A | * | 8/1977 | Funk | 446/397 |
| 4,310,986 A | * | 1/1982 | Jacobs | 446/397 |
| 4,343,108 A | * | 8/1982 | Lee | 446/397 |
| 4,422,262 A | * | 12/1983 | Moss | 446/397 |
| 4,606,733 A | * | 8/1986 | Willis | 446/397 |
| 4,648,852 A | * | 3/1987 | Wingate | 446/397 |
| 4,662,858 A | * | 5/1987 | Hall | 446/397 |
| 4,664,641 A | * | 5/1987 | Hearn et al. | 446/397 |
| 4,836,822 A | * | 6/1989 | Finley et al. | 446/397 |
| 4,846,753 A | * | 7/1989 | Langston | 43/1 |
| 4,932,920 A | * | 6/1990 | Hearn | 446/397 |
| 4,941,858 A | * | 7/1990 | Adams | 446/397 |
| 4,955,845 A | * | 9/1990 | Piper | 428/542.4 |
| 4,988,325 A | * | 1/1991 | Alderson et al. | 446/397 |
| 5,066,260 A | * | 11/1991 | Lindler | 446/397 |
| 5,158,494 A | * | 10/1992 | Ball | 446/397 |
| 5,334,074 A | * | 8/1994 | Suminski | 446/418 |
| 5,380,235 A | * | 1/1995 | Forbes et al. | 446/397 |
| 5,484,319 A | * | 1/1996 | Battey | 446/397 |
| 5,503,585 A | * | 4/1996 | Heineman | 43/2 |
| 5,529,526 A | * | 6/1996 | Wesley | 446/397 |
| 5,830,036 A | * | 11/1998 | Richardson | 446/397 |
| 5,846,119 A | * | 12/1998 | Long | 446/397 |
| 5,921,842 A | * | 7/1999 | Allenby | 446/397 |
| 6,071,172 A | * | 6/2000 | Pate | 446/397 |
| 6,149,493 A | * | 11/2000 | Long | 446/397 |
| 6,159,068 A | * | 12/2000 | Trotter | 446/188 |
| 6,168,493 B1 | * | 1/2001 | Kirby | 446/397 |
| 6,264,527 B1 | * | 7/2001 | Sabol, Jr. | 446/397 |
| 6,328,626 B1 | * | 12/2001 | Eubanks | 446/213 |

* cited by examiner

Primary Examiner—Derris H. Banks
Assistant Examiner—Urszula Cegielnik
(74) Attorney, Agent, or Firm—Carrithers Law Office, PLLC; David W. Carrithers

(57) ABSTRACT

A compact one-handed thumb actuated friction type turkey call is formed generally of a rectangular, elongated hollow wooden sound chamber box assembly having longitudinally opposed side walls with a double longitudinally convex bottomed striker pivotally mounted to one end block at one end thereof for oscillation across the sound chambers opposed walls. The striker having the end opposite of the pivotal mount cut at an angle and having a rectangular shaped thumb tab affixed to the flat upper side angle cut end is actuated by the operator by holding the call across ones palm and pushing the thumb tab. A closed, looped, stretchable band biases the striker back to an open position which is slightly unparallel to the position of the sound chamber box when in the open position.

31 Claims, 1 Drawing Sheet

SINGLE HAND ACTUATED FRICTION TYPE BOX CALL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Hereto, on present box call, a striker lid is a rectangular paddle that covers the open side of a rectangular hollowed box. The lid having a short handle that protrudes out past the end of the box. The call is actuated by striking the longitudinally, double convex bottom of the striker lid against the top of the box sidewall in an open and close scissor type motion. The lid pivots on an axis at the opposite end of the handle. Reference to U.S. Pat. No. 4,343,108 to Ben Lee (1982). Even though these calls can be mastered in due time with great manipulation, there are disadvantages.

(a) Past box calls that are actuated from the end of the handle have a mechanical disadvantage. The reason being that the handle is at the furthest point from the pivot axis. When the lid is actuated the operator's arm becomes an extension of the handle creating unwanted excessive motion that can be detected by the hunted game.

(b) Due to actuating the striker lid from a handle at one end, it is difficult to produce certain sounds of the wild turkey, specifically the "cluck and purr" and the "cutting" calls of the hunted game.

(c) The present handle of box calls protrudes out past the body of the box. This causes the lid to be knocked around in the hunter's pocket or vest causing unwanted sounds during transportation possibly alerting the hunted game.

(d) Present box calls are operated with two hands. One hand to hold the bottom of the box sound chamber and one to actuate the striker lid by its handle.

BRIEF SUMMARY OF THE INVENTION

The single hand actuated friction type box call of the present invention consists of three principal components, a generally rectangular wooden box, a longitudinally double convex bottom striker lid and a return mechanism. A generally rectangular, elongated hollow wooden sound chamber box is up by the assembly of a horizontal base, a front and back wall and a pair of opposed end blocks place one at each end of the base and between each sidewall. A handle less double convex bottom striker lid, with a thumb slide tab attached to its' top side, is hinged to one end block of the sound box to provide an axis point for movement of the striker lid. This axis point may consist of a screw that passes through a pre-drilled hole in the striker lid and a spring before fastening to the end block of the sound chamber box. The return mechanism serves a dual purpose of holding the striker lid in an open position and holding the striker lid against the top of the elongated, convex-topped back wall. The return mechanism may consist of a mounted eyelet connected to the double convex bottom side of the striker lid. This eyelet is aligned with a hole drilled through the elongated, convex-topped back wall of the sound box. A looped stretchable band may be connected through the eyelet then threaded through the drilled hole in the back wall and then wrapped around the end of the sound chamber end block. The band is then held in place in one of the three variable tension connectors that may be notched into the side of the base on the opposite end from the pivot screw and on the opposite side from the hole drilled in the side back wall. The call can be easily actuated by holding the call on its side in the palm of the hand and resting the thumb on the top of the striker lid and against the slide thumb tab then squeezing the lid shut. The call is now actuated with just the movement of the thumb and cut down on excess movement. The tension from the looped, stretchable band returns the lid to the open position plus it sets the correct tension between the striker lids against the sound chamber box wall. This preset tension helps the call produce otherwise difficult calls like the "cluck and purr" and the "cutting" call. Since there is now no protruding handle extending out past the body of the call all unwanted sounds are silenced during transportation of the call. Still further objects and advantages will become apparent from a consideration of the ensuing description and drawing.

The compact one hand operated, friction type, turkey box call comprises a generally rectangular, elongated hollow wooden sound box assembly forming internally a sound chamber, a double convex bottomed striker assembly, and means for mounting the striker for pivotal movement across the open top of the elongated hollow wooden box against the contactable wall of the sound chamber box imitating the kee-olking sound of the live wild turkey. The turkey call further comprises a looped, stretchable band means carried by the sound chamber box, operatively engaging the striker for resisting movement of the striker across the contactable wall of the sound chamber box as to normally bias said striker into a position slightly unparallel to the sound chamber box. The striker is a planar member having parallel surfaces, one being flat and the opposite being of a double longitudinally convex side and one end of the striker being cut in a pointed angle in shape and at the opposite end of the striker a means for pivotal mounting to the sound chamber box for pivoting about an axis perpendicular to the longitudinal axis of the contactable wall of the sound chamber box. The wooden sound chamber box assembly comprises a horizontal base, laterally opposed, vertical front and rear walls extending along opposite sides of the base and parallel to each other and opposed end blocks connected at opposite ends to respective ends of the base and the front and rear walls of the sound box assembly. One end of the striker is pivoted to one of the end blocks for oscillation about a pivot axis perpendicular to the longitudinal axis of the sound chamber box contactable wall. The biasing means comprises a looped, stretchable band connected to the bottom of the double convex side of the striker then the band passes through a hole in one of the walls of the sound chamber box then positioned around the end block of the chamber box projecting the striker to an open position that is slightly unparallel to the longitudinal position of the sound chamber box. The turkey call striker assembly comprises a planar form, consisting of a flat upper side surface and an opposite double longitudinally convex bottom surface and having a width that is same as the base of the sound chamber box and consisting of one end opposite of the means of connection to the sound chamber box that is of a pointed angle shape. The angle edge surface is cut at a degree with the vertex of the angle starting at the corner of the flat upper surface end having a thumb tab slide being affixed along the upper flat side surface along the angle edge surface providing a means of actuating the striker assembly with the thumb of the operator of the call. The turkey call horizontal base comprises an elongated rectangular shape having three U-shaped notches being formed into the longitudinal edge of the base near the opposed end of the means of pivotal connection. scope of the appended claims.

BRIEF DESCRIPTION OF THE INVENTION

Figure 1:
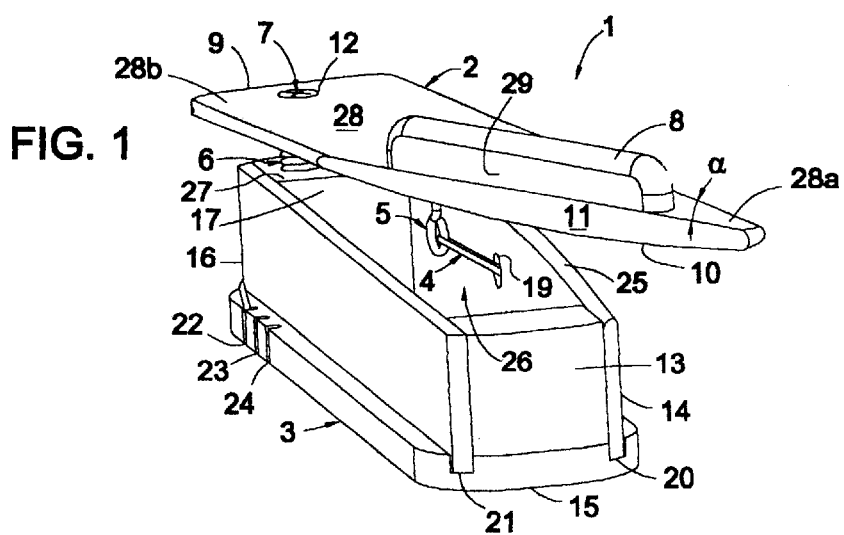
FIG. 1 depicts a perspective view forming one embodiment of the invention.
Figure 2:
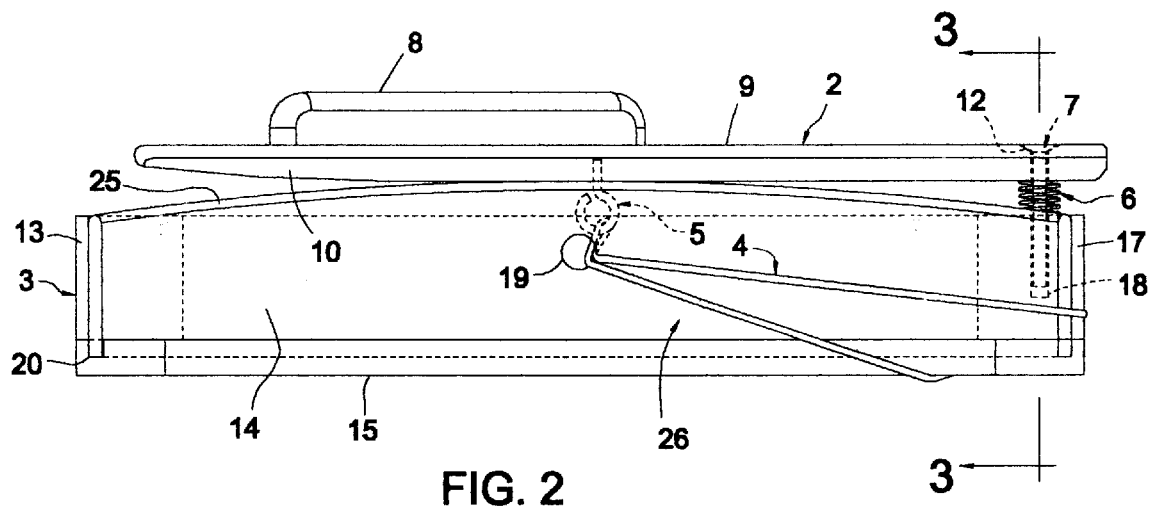
FIG. 2 depicts a side elevation view showing hidden embodiments.
Figure 3:
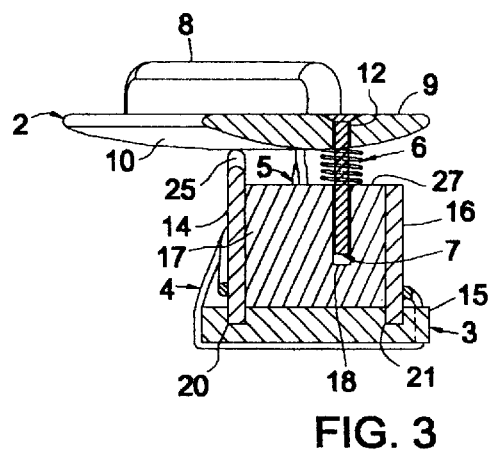
FIG. 3 depicts a vertical sectional view of FIG. 2 taken about line 4—4.

Referring to FIGS. 1–3 inclusive, a first embodiment of the present invention, the single hand actuated friction type box call indicated generally at 1, consist of three principal components, a generally rectangular, elongated hollow wooden sound chamber box assembly indicated generally at 3, a pivotal, double convex bottom striker assembly 2 and a return mechanism 26. From FIGS. 1–3 inclusive, the sound chamber box 3 consists in this embodiment, of a base 15, the front wall 16, the back wall 14, and a pair of longitudinally spaced opposed end blocks 13,17. Members 13,14,15,16,17 are preferably formed of wood, glued together, and forming a hollow interior sound chamber box 3. The base 15 is of rectangular form as is the front wall 16 and back wall 14. The back wall 14 is rectangular in form consisting of a longitudinally convex topside 25. The front wall 16 and the back wall 14 being at right angles to the base 15 are glued or otherwise fixed thereto at the lower end thereof and extending along opposite longitudinal sides of the base 15. The end blocks 13, 17, are of the exact height, width, and thickness to each other. The width of each end block should be equal to the exact measurement from between the wall grooves 20, 21 of the base 15. Their height is equal to that of the front wall after it is set into the wall groove 21 of the base 15. The grooves 20, 21 should be about one-eighth deep. End blocks 13, 17 should be glued at their point of contact with the front wall 16 and the back wall 14 and their point of contact with the base 15 to form a single hollow sound chamber box 3. End block 17 has a small hole drilled into the top face 27 for the pivotal connecting screw 7. The hole 18 is offset slightly from the center of the block toward the front wall 16 as seen in FIG. 3.

From FIGS. 1–3 inclusive, the striker assembly 2, consist in this embodiment, of a lid 9 and a thumb slide tab 8. The striker lid 9 which is also preferably formed of wood is rectangular, is of elongated, planar form, consisting of a flat upper side surface 28, a double longitudinally convex bottom side 10 which makes surface contact with the elongated, convex top side 25 of back wall 14. The bottom side 10 should be chalked with a non-wax chalk to keep the contact surfaces 10 and 25 dry to properly produce the desired sound from the sound chamber 3. The end of the striker lid 9 opposite of the pivotal connecting screw 7 and on the same side as the front wall 16 is cut at an angular shape that points toward the end block 13. The length of the striker lid 9 is made to the same length as the base 15. The width of the striker lid 9 at the same end as the pivotal connecting screw 7 is the same as the width of base 15. The angle edge surface 11 of the striker lid 9 is cut at α degrees with the vertex of the angle starting at the corner of the flat side surface 28a. The thumb slide 8, being preferably formed of wood, is of an elongated, rectangular shape with a length that is shorter than the angled edge surface 11 length and a height and width of about one-quarter of an inch but can be varied in size. It is glued to the upper flat side surface 28 and aligned flush from the angle edge surface 11 to the thumb slide face 29. The thumb slide tab 8 is centered to the length of the angled edge surface 11 length. The striker assembly 2 is mounted to the sound box chamber 3 at the end block 17 via the lid screw 7. The lid screw 7 passes through the lid hole 12. A compression spring 6 is fitted over the lid screw 7 before it inserts into the end block hole 18. The depth of the end block hole 18 is made so that it does not pass through the bottom of end block 17. The lid screw must be of a long enough length that it can pass through the lid hole 12 and compression spring 6. The lid hole 12 diameter should be large enough to allow the lid screw 7 to freely pass through the lid hole 12 loosely to allow the striker assembly 2 to slightly wobble on the lid screw 7 and compression screw 6. The lid hole 12 is drilled center to the width of the striker lid 9 and directly above the end block hole 18 when the striker lid 9 is longitudinally center to the length of the box sound chamber 3.

From FIGS. 1–3 inclusive, the return mechanism 26, consist of four components. The mounted eyelet 5, a looped, stretchable band 4, a wall hole 19, and the variable tension connecting points 22, 23, 24. The wall hole 19 is drilled through and centered to the length of the back wall 14. The mounted eyelet 5 is mounted to edge of the bottom of the striker lid 9 on the same side as the back wall 14. When the eyelet 5 is mounted it is inset about one-quarter of an inch toward the center from the edge of the striker lid 9. The wall hole 19 is drilled in alignment with the mounted eyelet after it has been affixed to the bottom of the striker lid surface 10. The diameter of the wall hole 19 should be the same as the diameter of the mounted eyelet 5. The looped, stretchable band 4 connects to the mounted eyelet 5 then passes through the wall hole 19. It then wraps around the outside of the end block 17 to be then inserted into one of the three variable tension-connecting points 22, 23, 24. The variable tension connecting points 22, 23, 24 are one-eighth of an inch notches that are formed or cut into the horizontal base 15 of the sound chamber box 3 below the front wall 16 side at the end block 17 end of the base 15. Each connecting point 22, 23, 24 are spaced roughly one-quarter of an inch apart with the first one starting three-quarter of an inch from the end of the base 15. The depth of the connecting points 22, 23, 24 are cut deep enough to secure the looped, stretchable band 4, but not so deep that they cut into the wall groove 21 of the box sound chamber base 15. By placing the looped band 4 into the different variable tension connectors 22, 23, 24 the user can vary the tension of the contact surface between the back wall 14 and the double longitudinally convex bottom 10 of the striker lid 9. The looped, stretchable band 4 will bring the striker assembly 2 back to the open position until the mounted eyelet 5 hits the inside of the back wall 14 at the wall hole 19 at which point the mounted eyelet stops the striker assembly 2. The striker assembly 2 is then ready to be cycled by placing the thumb on the thumb slide 8 and squeezing the striker assembly 2 shut to start the sounding of the box sound chamber 3. The pivotal connecting screw 7 can be tightened or loosened to change the path of contact between the striker lid bottom surface 10 and the top of the back wall 14 on the convex surface 25.

I claim:

1. A compact hand operated, friction type, box call comprising:
    a generally rectangular, elongated hollow wooden sound box forming internally a sound chamber, said sound box comprising a base connecting to a front end wall connecting a pair of spaced apart parallel contactable side walls to a back end wall;

a striker lid comprising a generally rectangular, elongated planar member for cooperatively engaging said hollow wooden sound box, said elongated planar member defining a top flat surface and a bottom double longitudinally convex surface, said planar member having a generally rectangular front end and an opposing end including an angular portion;

a tab mounted to said top flat surface of said striker lid;

means for pivotal mounting said striker lid for pivotal movement across the open top of said sound box, against and perpendicular to, the longitudinal axis of a selected contactable wall of said sound box;

compression means for holding said striker lid a selected and adjustable distance from said sound box where said striker lid is pivotally mounted to said sound box;

means for holding projecting from said bottom surface of said striker lid limiting pivotal movement thereof;

said side wall of said sound box opposite said angular portion of said striker lid including an opening in alignment with said means for holding; and means of biasing said striker lid against a contactable wall of said sound box for resisting movement of said striker across said contactable wall of said sound box and normally biasing said striker lid into a position slightly unparallel to said sound box.

2. The box call of claim 1, wherein said means for biasing said striker lid against a contactable wall of said sound box comprises a stretchable band connecting to said means for holding and extending through said opening in said side wall, said distal end of said stretchable band attaching to a retaining means.

3. The box call of claim 1, wherein said means for biasing said striker lid against a contactable wall of said sound box comprises a stretchable band connecting to said means for holding and forming a loop extending through said opening in said side wall, said loop having a portion extending around a front end of said sound box and a portion extending beneath said sound box to a retaining means.

4. The box call of claim 3, wherein said retaining means is at least one notch formed in a side edge of said base opposite said opening.

5. The box call of claim 3, wherein said retaining means comprises a selected one of a plurality of U-shaped notches being formed into said longitudinal edge of said base.

6. The box call of claim 1, wherein said means for pivotal mounting said striker lid to sail sound box is a screw.

7. The box call of claim 1, wherein said means for holding is an eye screw.

8. The box call of claim 6, wherein said compression means is a spring coaxially mounted to said screw.

9. A box call comprising:

a generally rectangular, elongated hollow wooden sound box forming internally a sound chamber, said sound box comprising a base connecting to a front end wall connecting a pair of spaced apart generally parallel side walls to a back end wall;

a striker lid comprising a generally rectangular, elongated planar member for cooperatively engaging said hollow wooden sound box, said elongated planar member defining a top surface and a bottom longitudinal convex surface;

means for holding mounting to said top surface of said striker lid;

means for pivotal mounting said striker lid for pivotal movement across the open top of said sound box, against and perpendicular to, the longitudinal axis of a selected side wall of said sound box;

compression means for holding said striker lid a selected and adjustable distance from said sound box where said striker lid is pivotally mounted to said sound box;

means for holding projecting from said bottom surface of said striker lid limiting pivotal movement thereof;

at least one of said side walls of said sound box including an opening in alignment with said means for holding; and means of biasing said striker lid against at least one side wall of said sound box for resisting movement of said striker across said at least one side wall of said sound box and normally biasing said striker lid into a position slightly unparallel to said sound box.

10. The box call of claim 9, wherein said planar member comprises a generally rectangular front end and an opposing end including an angular portion.

11. The box call of claim 9, wherein said means for holding comprises a tab mounted to said top surface of said striker lid.

12. The box call of claim 9, wherein said means for biasing said striker lid against a side wall of said sound box comprises a stretchable member connecting to said means for holding and extending through said opening in said side wall, said distal end of said stretchable member attaching to a retaining means.

13. The box call of claim 12, wherein said stretchable member comprises a band.

14. The box call of claim 9, wherein said means for biasing said striker lid against at least one side wall of said sound box comprises a stretchable band connecting to said means for holding and forming a loop extending through said opening in said at least one of said side walls having an opening, said loop having a portion extending around a front end of said sound box and a portion extending beneath said sound box to a retaining means.

15. The box call of claim 9, wherein said base includes a longitudinal edge extending pass said side walls.

16. The box call of claim 14, wherein said base includes a longitudinal edge extending pass said side walls and said retaining means comprises at least one notch formed in said edge of said base opposite said side wall having an opening.

17. The box call of claim 14, wherein said retaining means comprises a selected one of a plurality of U-shaped notches being formed into said longitudinal edge of said base.

18. The box call of claim 9, wherein said means for pivotal mounting said striker lid to said sound box is a screw.

19. The box call of claim 9, wherein said means for holding is an eye screw anchored in tae bottom surface of said striker lid at a selected position.

20. The box call of claim 18, wherein said compression means is a spring coaxially mounted to said screw.

21. The box call of claim 9, wherein said box call is operable with one hand.

22. A box call comprising:

a generally rectangular, elongated hollow wooden sound box forming internally a sound chamber, said sound box comprising a base connecting to a front end wall connecting a pair of spaced apart generally parallel side walls to a back end wall;

a striker lid comprising a generally rectangular, elongated planar member for cooperatively engaging said hollow wooden sound box, said elongated planar member defining a top surface and a bottom longitudinal convex surface with a generally rectangular front end and an opposing end including an angular portion;

means for holding comprising a tab mounting to said top surface of said striker lid;

means for pivotal mounting said striker lid for pivotal movement across the open top of said sound box, against and perpendicular to, the longitudinal axis of a selected side wall of said sound box selected from the group consisting of a screw, a nail, and a pin;

compression means comprising a spring for holding said striker lid a selected and adjustable distance from said sound box where said striker lid is pivotally mounted to said sound box;

means for holding projecting from said bottom surface of said striker lid limiting pivotal movement thereof;

at least one of said side walls of said sound box including an opening in alignment with said means for holding; and means of biasing said striker lid against at least one side wall of said sound box for resisting movement of said striker across said at least one side wall of said sound box and normally biasing said striker lid into a position slightly unparallel to said sound box.

23. The box call of claim 22, wherein said means for biasing said striker lid against a side wall of said sound box comprises a stretchable member connecting to said means for holding and extending through said opening in said side wall, said distal end of said stretchable member attaching to a retaining means.

24. The box call of claim 23, wherein said stretchable member comprises a band.

25. The box call of claim 22, wherein said means for biasing said striker lid against at least one side wall of said sound box comprises a stretchable band connecting to said means for holding and forming a loop extending through said opening in said at least one of said side walls having an opening, said loop having a portion extending around a front end of said sound box and a portion extending beneath said sound box to a retaining means.

26. The box call of claim 22, wherein said base includes a longitudinal edge extending pass said side walls.

27. The box call of claim 25, wherein said base includes a longitudinal edge extending pass said side walls and said retaining means comprises at least one notch formed in said edge of said base opposite said side wall having an opening.

28. The box call of claim 25, wherein said retaining means comprises a selected one of a plurality of U-shaped notches being formed into said longitudinal edge of said base.

29. The box call of claim 22, wherein said means for holding is an eye screw anchored in the bottom surface of said striker lid at a selected position.

30. The box call of claim 22, wherein said compression means is a spring coaxially mounted to said screw.

31. The box call of claim 22, wherein said box call is operable with one hand.

* * * * *